United States Patent
Allgeier et al.

(10) Patent No.: US 10,880,389 B2
(45) Date of Patent: Dec. 29, 2020

(54) CUSTOMIZED APPLICATION ARCHITECTURE UTILIZING SPARSE AND BASE METADATA LAYERS

(71) Applicant: NextWorld LLC, Denver, CO (US)

(72) Inventors: Axel Allgeier, Parker, CO (US); Vito Solimene, Highlands Ranch, CO (US)

(73) Assignee: NextWorld LLC, Denver, CO (US)

( * ) Notice: Subject to any disclaimer, the term of this patent is extended or adjusted under 35 U.S.C. 154(b) by 179 days.

(21) Appl. No.: 15/912,143

(22) Filed: Mar. 5, 2018

(65) Prior Publication Data
US 2019/0273796 A1    Sep. 5, 2019

(51) Int. Cl.
| H04L 29/08 | (2006.01) |
| G06F 9/451 | (2018.01) |
| G06F 16/16 | (2019.01) |
| G06F 16/907 | (2019.01) |

(52) U.S. Cl.
CPC .......... *H04L 67/2823* (2013.01); *G06F 9/451* (2018.02); *G06F 16/164* (2019.01); *G06F 16/907* (2019.01); *H04L 67/2804* (2013.01)

(58) Field of Classification Search
CPC ............. H04L 67/1097; H04L 67/2842; H04L 67/2804; H04L 67/2823; G06F 11/3006; G06F 9/466; G06F 3/0644; G06F 15/16
USPC ................................................ 709/203, 246
See application file for complete search history.

(56) References Cited

U.S. PATENT DOCUMENTS

| 7,603,657 | B2* | 10/2009 | Gassner | G06F 9/06 717/113 |
| 9,916,203 | B1* | 3/2018 | Pogde | G06F 11/1448 |
| 9,996,426 | B1* | 6/2018 | Pogde | G06F 16/184 |
| 10,055,420 | B1* | 8/2018 | Pogde | G06F 16/172 |
| 2011/0131605 | A1* | 6/2011 | Pratt | H04N 21/47815 725/39 |
| 2012/0290811 | A1* | 11/2012 | Cilibrasi | G06F 3/0679 711/172 |
| 2013/0290101 | A1* | 10/2013 | Arini | G06Q 30/0207 705/14.55 |
| 2015/0092847 | A1* | 4/2015 | Su | H04N 19/33 375/240.12 |
| 2015/0319506 | A1* | 11/2015 | Kansara | H04N 21/44008 725/32 |
| 2016/0119400 | A1* | 4/2016 | Elliott | H04L 67/42 709/203 |
| 2018/0246933 | A1* | 8/2018 | Darrow | H04L 51/04 |

\* cited by examiner

*Primary Examiner* — Tesfay Yohannes

(57) ABSTRACT

In non-limiting examples of the present disclosure, systems, methods and devices for assisting with provisioning individualized application instances are provided. A request to render an individualized instance of an application may be received. A determination may be made based on the request as to whether a sparse metadata chunk exists for each of a plurality of user interface elements associated with the application. A sparse metadata application artifact may be generated for each user interface element for which a sparse metadata chunk is determined to exist. A base user interface chunk of metadata may be identified for each user interface element for which a sparse metadata chunk is determined not to exist. A base metadata application artifact may be generated for each identified base user interface chunk of metadata, and the individualized instance of the application may be caused to be displayed.

20 Claims, 8 Drawing Sheets

CUSTOMIZED APPLICATION ARCHITECTURE UTILIZING SPARSE AND BASE METADATA LAYERS

BACKGROUND

Enterprise resource planning (ERP) software provides mechanisms for company personnel to plan and manage various resources associated with the company's business from one or more applications. Aspects of a business that can be tracked or otherwise managed utilizing ERP software include: sales management, production planning, manufacturing or service delivery, marketing, materials management, inventory management, retail, shipping and payment, and financials. Although ERP software can be tailored to a company based on a particular application or application suite that the company utilizes, the specific mechanics included in such applications or application suites may include superfluous features and/or there may be certain features that company personnel would like, but which nonetheless do not exist in current software packages. That is, a one size fits all solution in ERP software is difficult to apply because the wants and needs of each company are different, and those wants and needs are often in flux due to a variety of factors.

While custom ERP software may fill some of the needs described above, the cost involved with designing custom software is often prohibitive. Additionally, where an ERP software development company may have many different custom software clients, it is difficult and time consuming to upgrade and/or fix software elements that may be common amongst each client.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for provisioning individualized application instances. In some examples, custom software instances of one or more applications may be implemented by one or more users associated with one or more lifecycles. A lifecycle may comprise a unique user, a geographic zone where software is accessed from, a geographic zone that a user is associated with, a tenant, a user group, and the like. Thus, each user or user group representative of a lifecycle may utilize software that is similar at a base level, but which has been customized to their unique requirement and/or desires.

According to some examples, a base application may be comprised within a base layer of metadata, while each customization of that software, including customization for each user, tenant and/or lifecycle, may be comprised within a sparse metadata layer. The sparse metadata layer may be distributed amongst one or more storage devices. In this manner, customization of software for a large number of users may be implemented such that a when a request to render an individualized instance of an application is received, the request can be analyzed to determine which custom metadata chunks to obtain from the sparse metadata layer, and which metadata chunks to obtain from the base metadata layer in order to respond to the request. For example, if a user has custom UI elements in their custom software package, those elements may be provided in one or more metadata chunks in the sparse metadata layer, while the non-custom elements of their software package may be included in metadata chunks that are in a base metadata layer. Upon identifying the requisite metadata chunks in the sparse and base metadata layers to respond to an application instance request, those chunks may be generated into artifacts, and a custom application user interface may be provided to a user interface corresponding to the request.

DETAILED DESCRIPTION

Figure 1:
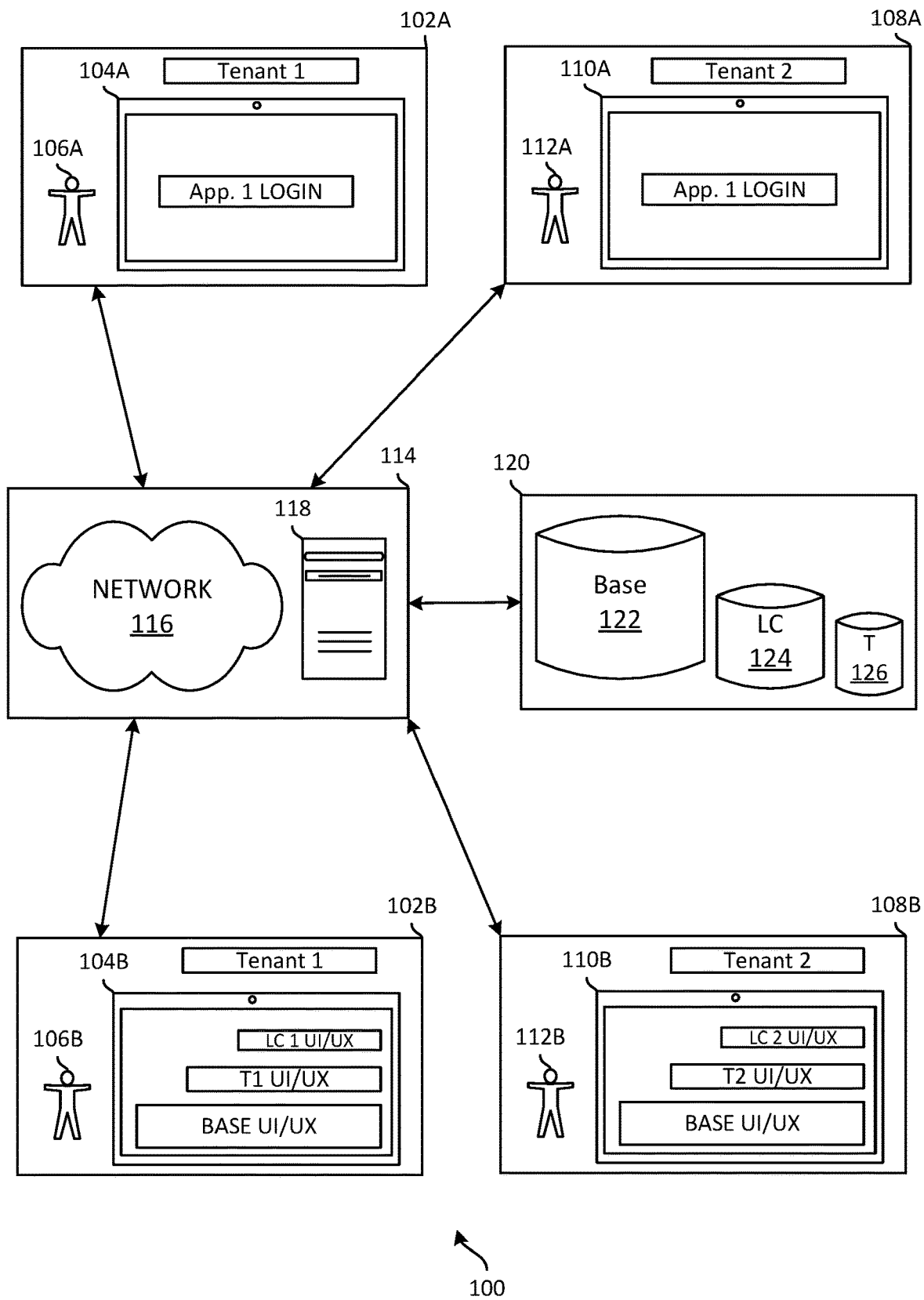
FIG. 1 is an exemplary distributed computing architecture for implementing two unique application instances of an application utilizing sparse metadata and base metadata.

Various embodiments will be described in detail with reference to the drawings wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described herein are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Generally, the present disclosure is directed to systems, methods and devices for provisioning individualized application instances. In an example, a method is provided, the method comprising: receiving a request to display an individualized application instance of an application, the request comprising at least one sparse metadata identifier associated with the application instance; identifying sparse metadata associated with the at least one sparse metadata identifier; identifying base metadata associated with the application; generating the application instance based on the identified sparse metadata and the identified base metadata; and causing the application instance to be displayed on a graphical user interface associated with the request.

In another example a system for provisioning individualized application instances is provided. The system may comprise: at least one processor; and a memory operatively connected to the at least one processor, the memory comprising computer-executable instructions that, when executed by the at least one processor, are operative to: receive a request to display an individualized application instance of an application, the request comprising at least one sparse metadata identifier associated with the application instance; identify sparse metadata associated with the at least one sparse metadata identifier; identify base metadata associated with the application; generate the application instance based on the identified sparse metadata and the identified base metadata; and cause the application instance to be displayed on a graphical user interface associated with the request.

In still another example, a computer-readable storage device for assisting with provisioning an individualized application instance is provided. The computer-readable storage device may comprise executable instructions that, when executed by one or more processors, assist with provisioning an individualized application instance, the computer-readable storage device including instructions executable by the one or more processors for: receiving a request to render an individualized instance of an application; determining, based on the request, whether a sparse metadata chunk exists for each of a plurality of user interface elements associated with the application; generating, for each user interface element for which a sparse metadata chunk is determined to exist, a sparse metadata application artifact; identifying, for each user interface element for which a sparse metadata chunk is determined not to exist, a base user interface chunk of metadata; and generating, from each identified base user interface chunk of metadata, a base metadata application artifact; and causing, based on the sparse metadata application artifacts and the base metadata application artifacts, the individualized instance of the application to be displayed.

FIG. 1 is an exemplary distributed computing architecture 100 for implementing two unique application instances of an application utilizing sparse metadata and base metadata. Distributed computing architecture 100 includes first request instance environment 102A, second request instance environment 108A, network and processing environment 114, metadata storage environment 120, first display instance environment 102B, and second display instance environment 108B.

First request instance environment 102A includes user 106A and a graphical user interface for a first application, which is displayed on computing device 104A. User 106A may provide a password or other identifying information to computing device 104A, which may be utilized to login to the first application. In some examples, user 106A, and their associated application login information, may be associated with a tenant and/or a lifecycle which relates to the first application. In examples, a tenancy associated with the first application may comprise one or more users having the same administrator associated with them, and each user associated with the tenancy may have unique user interface and/or user experience elements associated with the first application based on the tenancy. In additional examples, a lifecycle may comprise one or more settings and/or user interface elements and/or user experience elements of the first application that are associated with one or more application users, a geographic zone that one or more application users are associated with (e.g., they are currently located at, they work at, they reside at, etc.), a password and/or other login information associated with one or more application users, etc.

Likewise, second instance environment 108A includes user 112A and a graphical user interface for the same application as shown in first request instance environment 102A, which is displayed on computing device 110A. User 112A may provide a password or other identifying information to computing device 110A, which may be utilized to login to the first application. In some examples, user 112A, and user 112A's associated application login information (e.g., user 112A's credentials), may be associated with a tenant and/or a lifecycle which relates to the first application. In examples, a tenancy associated with the first application may comprise one or more users having the same administrator associated with them, and each user associated with the tenancy may have unique user interface and/or user experience elements associated with the first application based on the tenancy. In additional examples, a lifecycle may comprise one or more settings and/or user interface elements and/or user experience elements of the first application that are associated with one or more particular application users, a geographic zone that one or more application users are associated with (e.g., they are currently located at, they work at, they reside at, etc.), a password and/or other login information associated with one or more application users, etc.

When user 106A provides application login credentials to computing device 104A for the first application, that information may be sent from computing device 104A to one or more remote computing devices, such as server computing device 118, via network 116. Server computing device 118 may analyze the login credentials received from computing device 104A, and determine: which application user 106A is attempting to access, whether user 106A has entered requisite credentials to access the requested application, and whether there are one or more custom metadata chunks (e.g., sparse metadata chunks, lifecycle-specific metadata chunks, tenant-specific metadata chunks) associated with a particular tenancy and/or lifecycle related to user 106A's credentials. Upon making one or more of those determinations associated with user 106A's credentials, server computing device 118 may send a request for application metadata associated with user 106A's request. For example, server computing device 118 may send a request for first application metadata in metadata storage environment 120.

Metadata storage environment 120 includes base metadata storage 122, lifecycle metadata storage 124, and tenant metadata storage 126. One or more metadata chunks in tenant metadata storage 126 may comprise information that may be utilized to provide a customized user interface and or user experience element associated with the first application to a user associated with a particular tenancy credential. In some examples, one or more metadata chunks in tenant metadata storage 126 may comprise information that may be utilized to provide a customized workflow and/or customized workflow elements for one or more ERP applications. Likewise, one or more metadata chunks in lifecycle metadata storage 124 may comprise information that may be utilized to provide a customized user interface and/or user experience element associated with the first application to a user associated with a lifecycle credential. In some examples, one or more metadata chunks in lifecycle metadata storage 124 may comprise information that may be utilized to provide a customized workflow and/or customized workflow elements for one or more ERP applications. According to examples, base metadata storage 122 may include metadata chunks for providing non-customized user interface and/or user experience elements for the first application. That is, while lifecycle metadata storage 124 and tenant metadata storage 126 include metadata chunks for one or more customized elements of the first application, base metadata storage 122 includes metadata chunks which can be utilized to generate the entirety of the first application, in a non-customized manner, and or metadata chunks from base metadata storage 122 may be combined with metadata chunks from one or both of tenant metadata storage 126 and/or lifecycle metadata storage 124 to provide a semi-customized application experience. In some examples, users may modify one or more base metadata elements when customized application elements are created via tenant metadata and/or lifecycle metadata in relation to the creation and/or modification of customized applications. According to some aspects, a change handling engine associated with network and processing environment 114 may limit one or more elements associated with base metadata that can be modified by users. For example, the change handling engine may disallow users from making customized changes to one or more applications that would cause one or more application elements to function improperly and/or hinder administrative updating of base metadata and its subsequent use in combination with tenant metadata and/or lifecycle metadata.

If one or more custom metadata chunks for a particular tenant and/or lifecycle are determined to exist for received application credentials, those metadata chunks may be generated into corresponding custom elements for the first application, while the non-customized elements of the first application, for which there are no tenant or lifecycle metadata chunks, may be obtained from base metadata storage 122, and a custom application instance comprised of base metadata and tenant and/or lifecycle metadata chunks may be generated based on the combination of metadata chunks obtained from base metadata storage 122, lifecycle metadata storage 124, and tenant metadata storage 126.

Thus, in examples, if user 106A's application login credentials are associated with a particular tenancy, server computing device 118 may make a determination as to whether that tenancy has customized metadata associated with it, which may be stored in tenant metadata storage 126. Similarly, if user 106A's application login credentials are associated with a particular lifecycle, server computing device 118 may make a determination as to whether that lifecycle has customized metadata associated with it, which may be stored in lifecycle metadata storage 124. Upon making those determinations, a request may be sent from server computing device 118 to metadata storage environment 120 for metadata associated with the requesting user's credentials, including one or more metadata chunks from tenant metadata storage 126, lifecycle metadata storage 124, and base metadata storage 122.

Upon receiving the metadata chunks from metadata storage environment 120 corresponding to the application credentials submitted by user 106A, server computing device 118 may provide those chunks to a generation engine. The generation engine, which may be comprised in or association with server computing device 118, may utilize the metadata chunks to generate artifacts which are combined to create a customized user interface and user experience application instance for user 106A based on user 106A's application credentials. For example, upon retrieving one or more tenant metadata chunks and one or more lifecycle metadata chunks corresponding to user 106A's credentials, server computing device 118 may provide those custom metadata chunks, in addition to base metadata needed to complete the user interface and user experience elements of the application request, to a generation engine. The generation engine may utilize that metadata to produce the application instance shown on computing device 104B, which comprises: a custom lifecycle 1 user interface and/or user experience component corresponding to the lifecycle metadata obtained from lifecycle metadata storage 124 in metadata storage environment 120; a custom tenant 1 user interface and/or user experience component corresponding to the tenant metadata obtained from tenant metadata storage 126 in metadata storage environment 120, and a base user interface and/or user experience component corresponding to the base metadata obtained from base metadata storage 122 in metadata storage environment 122.

Similarly, upon receiving the metadata chunks from metadata storage environment 120 corresponding to the application credentials submitted by user 112A, server computing device 118 may provide those chunks to a generation engine. The generation engine may utilize the metadata chunks to generate artifacts which are combined to create a customized user interface and user experience application instance for user 112A based on user 112A's application credentials. For example, upon retrieving one or more tenant metadata chunks and one or more lifecycle metadata chunks corresponding to user 112A's credentials, server computing device 118 may provide those custom metadata chunks, in addition to base metadata needed to complete the user interface and user experience elements of the application request, to a generation engine. The generation engine may utilize that metadata to produce the application instance shown on computing device 110B, which comprises: a custom lifecycle 1 user interface and/or user experience component corresponding to the lifecycle metadata obtained from lifecycle metadata storage 124 in metadata storage environment 120; a custom tenant 2 user interface and/or user experience component corresponding to the tenant metadata obtained from tenant metadata storage 126 in metadata storage environment 120, and a base user interface and/or user experience component corresponding to the base metadata obtained from base metadata storage 122 in metadata storage environment 122.

Figure 2:
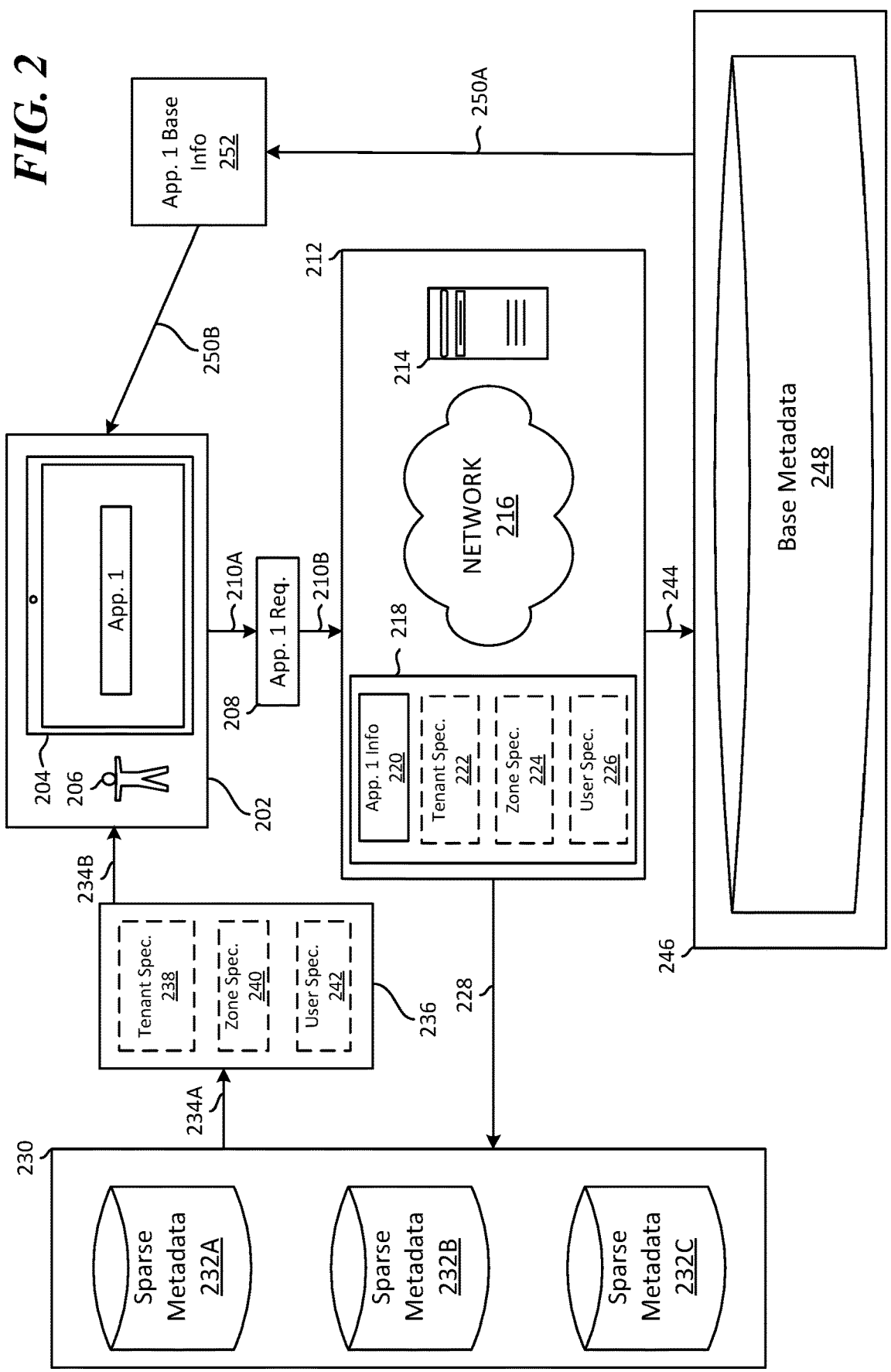
FIG. 2 is an exemplary distributed computing architecture illustrating the use of base metadata and sparse metadata in responding to a unique lifecycle request for an application instance.

FIG. 2 is an exemplary distributed computing architecture 200 illustrating the use of base metadata and sparse metadata in responding to a unique lifecycle request for an application instance. Distributed computing architecture 200 includes application request environment 202. Application request environment 202 includes user 206 and computing device 204 from which user is requesting access to application 1. In some examples, application 1 may be an application associated with an application suite, such as a sales application amongst a plurality of ERP applications. The application request 208 from user 206 may comprise credentials to access application 1 and/or credentials used to logon to computing device 204, which may grant access to application 1 and/or one or more additional applications associated with an ERP application suite.

Computing device 204 sends the application request 208 for processing by one or more computing devices, such as server computing device 214, in network and processing environment 212. In examples, server computing device 214 may receive the application request 208, via network 216, and make a determination as to whether the credentials that user 206 supplied to access application 1 are valid. Additionally, server computing device 214 may make a determination as to whether the credentials that user 206 provided are associated with a particular lifecycle and/or tenancy with regard to application 1 and/or one or more applications of an ERP application suite. For example, server computing device may make a determination based on the credentials provided by user 206 as to tenant and lifecycle information 218, which comprises making determinations as to what application info 220 user 206 has requested, what tenant specific information 222 user 206 is associated with in relation to application 1, what zone specific information 224 user 206 is associated with in relation to application 1, and what user specific information 226 user 206 is associated with in relation to application 1.

In examples where user 206's credentials have been determined to be associated with tenant-specific and/or lifecycle-specific information with regard to application 1, a request may be sent from network and processing environment 212 to sparse metadata storage environment 230. For exemplary purposes, sparse metadata storage environment 230 comprises sparse metadata storage 232A, sparse metadata storage 232B, and sparse metadata storage 232C. Each of sparse metadata storage 232A-232C may be associated with tenant and/or lifecycle specific metadata for one or more applications, such as application 1. In some examples, sparse metadata storage 232A-232C may comprise tenant and/or lifecycle specific metadata for a plurality of ERP applications of an ERP application suite. That is, sparse metadata storage 232A-232C may comprise metadata chunks for a plurality of custom application elements (e.g., custom user interface elements, custom user experience elements, custom workflow elements) for a plurality of ERP software clients of an ERP application suite provider.

When a request for sparse metadata associated with user 206's application 1 request is sent 228 to sparse metadata storage environment 230, that request may be routed, via network 216, to one or more sparse metadata storage devices, such as sparse metadata storage 232A, sparse metadata storage 232B, and sparse metadata storage 232C, in order to obtain relevant metadata chunks corresponding to the custom application metadata chunks that user 206 and/or user 206's lifecycle, and/or user 206's tenancy is associated with based on the credentials provided by user 206 to computing device 204. In some examples, user 206 may only have to provide credentials to access an application instance a first time, and each subsequent application instance request from computing device 204 may be processed utilizing those same application credentials and/or the permissions and settings associated with those credentials. Similarly, credentials used to access an application instance may provide a timeframe in which subsequent application instance requests from computing device 204 may be processed without having to resubmit credentials. Additionally, application credentials submitted with an application instance request may provide access to one or more applications of an application suite, such as one or more ERP applications of an ERP application suite for which those credentials provide access.

For ease of illustrative purposes, metadata chunks 236 obtained from sparse metadata storage environment 230 (e.g., tenant specific metadata chunks 238, zone specific metadata chunks 240, user specific metadata chunks 242) based on user 206's application 1 request are shown being transferred 234A and 234B directly back to computing device 204 in application request environment 202. However, those metadata chunks may be transferred to a generation engine, which may reside in one or more of the environments depicted in distributed computing architecture 200 and/or distributed computing architecture 100. The generation engine may generate artifacts based on the particular metadata chunks that are obtained from sparse metadata storage environment 230.

In addition to sending requests for sparse metadata to sparse metadata storage environment 230, a request for base metadata may be sent from network storage and processing environment 212 based on user 206's application 1 request. For example, if a determination is made by server computing device 214 that one or more elements of an application being requested by user 206 (e.g., application 1, an ERP application associated with an ERP application of an ERP application suite, etc.), or an application page (e.g., a specific page or instance of application 1, a specific page or instance of an ERP application of an ERP application suite, etc.), are not custom elements provided by sparse metadata associated with user 206's application request (e.g., tenant specific metadata, lifecycle specific metadata), a request may be sent 244 to retrieve those elements from base metadata storage 248 in base metadata storage environment 246. Thus, for each element of a requested instance of an application, server computing device 214 may make a first determination as to the custom application elements that may be generated from sparse metadata chunks obtained from sparse metadata storage (e.g., lifecycle metadata chunks associated with user credentials, tenant metadata chunks associated with user credentials), and server computing device 214 may obtain base metadata chunks from base metadata storage 248 for any application elements that are non-custom application elements. In some examples, it may be the case that there are no custom application elements. In such examples, the entirety of a requested application, or application page or instance, may be provided by way of base metadata chunks obtained from base metadata storage 248.

Upon receiving the requisite base metadata chunks from base metadata storage 248, a generation engine may generate corresponding base application artifacts from those base metadata chunks, and send 250A and 250B that base application information 252 back to computing device 204 for combination with the sparse metadata chunks and/or the corresponding generated artifacts for those sparse metadata chunks obtained from sparse metadata storage environment 230. Thus, a custom application 1 instance may be caused to be displayed based on a combination or user interface and/or user experience elements generated based on sparse metadata chunks and base metadata chunks obtained according to the credentials provided by user 206 in user 206's application 1 request 208.

Figure 3:
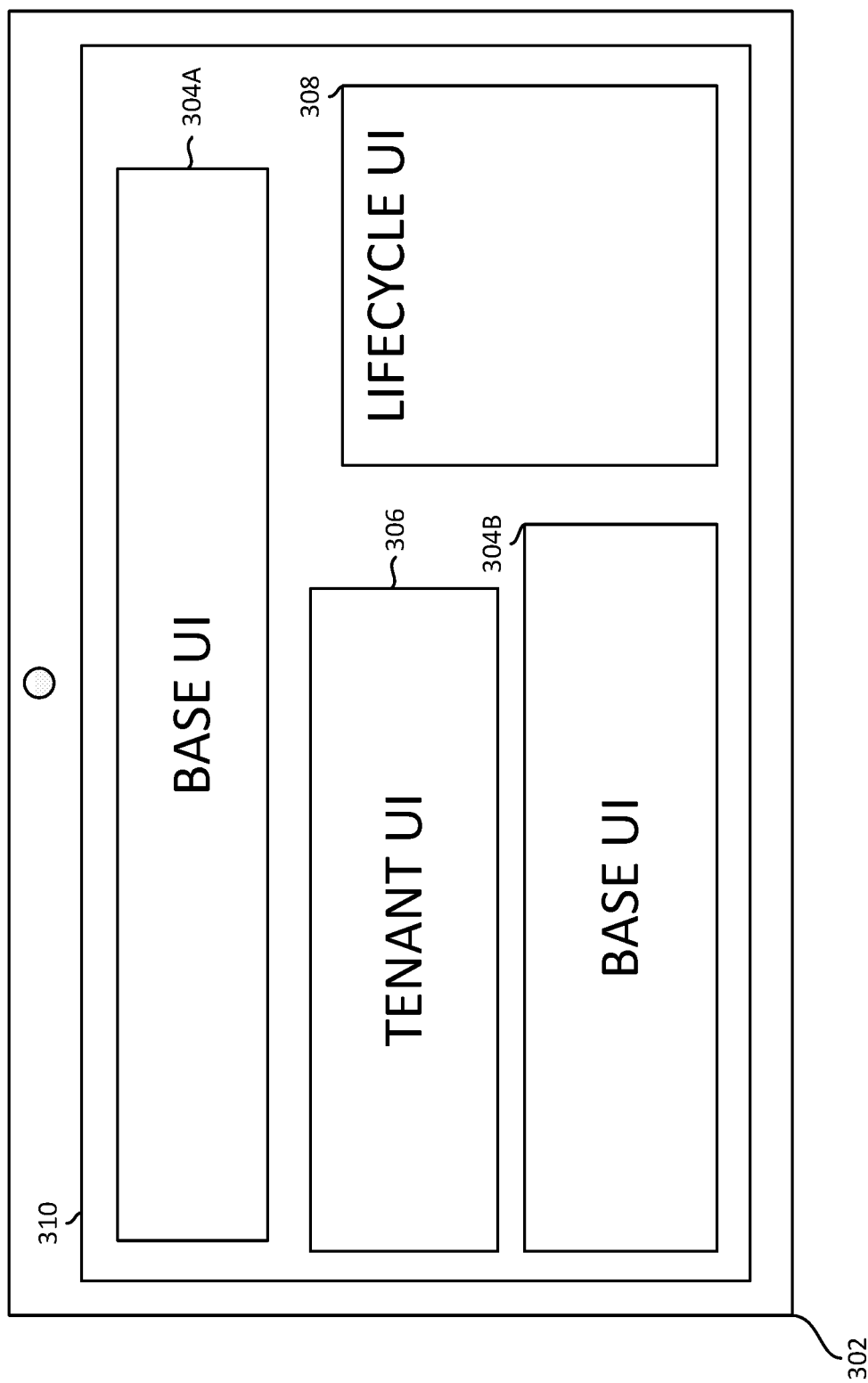
FIG. 3 depicts an exemplary display of an application user interface displayed based on generation of unique tenant and lifecycle artifacts, as well as base artifacts, in response to a unique application instance request.

FIG. 3 depicts an exemplary display of an application user interface 310 displayed on computing device 302 based on generation of unique tenant and lifecycle artifacts, as well as base artifacts, in response to a unique application instance request. The application user interface 310 may be caused to be displayed based on a request to display an instance of an application or application page (e.g., an ERP application request from a user based on provided user credentials). Thus, application user interface 310 comprises custom elements generated based on sparse metadata chunks associated with a requesting user's credentials which may be associated with a particular tenancy and/or lifecycle for which a custom application is maintained by an application provider (or maintained in association with cloud storage employed by an application provider), and application user interface 310 comprises non-custom elements generated based on base metadata chunks for which the requesting user does not have custom application elements associated with the particular tenancy and/or lifecycle. Specifically, application user interface 310 comprises: lifecycle user interface element 308, corresponding to one or more sparse metadata chunks obtained based on a particular lifecycle associated with credentials of the requesting application user; tenant user interface element 306, corresponding to one or more sparse metadata chunks obtained based on a particular tenancy associated with credentials of the requesting application user; and base user interface elements 304A and 304B, corresponding to one or more base metadata chunks, which are obtained based on the requisite non-custom elements that are required to complete the requesting application user's request.

Figure 4:
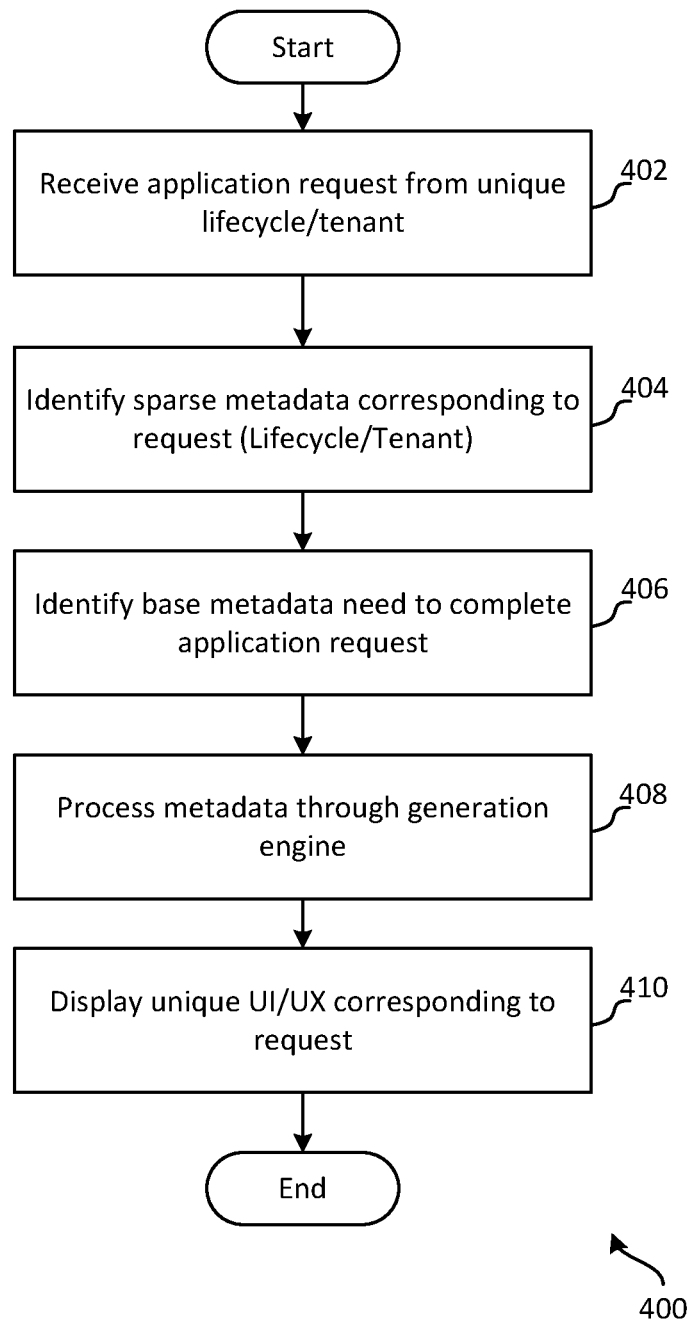
FIG. 4 illustrates an exemplary method for provisioning an individualized application instance utilizing sparse and base metadata.

FIG. 4 illustrates an exemplary method 400 for provisioning an individualized application instance utilizing sparse metadata (e.g., custom application metadata, lifecycle-specific metadata, tenant-specific metadata) and base metadata. In some examples, the application instance may comprise an ERP application instance. In additional examples the requested application may comprise one application of an ERP application suite comprising an plurality of ERP applications. In examples, an application provider may provide application instances for a plurality of applications to a plurality of tenants and/or unique lifecycles. Each tenant and/or unique lifecycle may be associated with one or more custom user interface and/or user experience application elements, which may be provided to requesting users based on those users' credentials. In some examples, custom tenant and/or lifecycle elements may be provided to a requesting application user in addition to base application elements based on the particular application elements that have been customized for a particular application tenancy and/or lifecycle, and which base application elements are required to complete an application request for a requesting user.

The method 400 begins at a start operation and flow continues to operation 402 where a request to access an application instance or an application page is received. The request may include user credentials associated with a particular lifecycle and/or tenancy for which one or more custom application elements have been associated with the particular lifecycle and/or tenancy. For example, a particular lifecycle and/or tenancy may be associated with custom user interface and/or user experience elements that have been customized based on the requirements and/or preferences provided by the requesting user, or an administrator associated with the requesting user, to the application provider. In some examples, custom application elements may comprise custom input fields, custom color schema, custom functions, custom fonts, custom column headings, custom row headings, custom display settings, custom user interface arrangements, custom video settings, custom audio settings, etc.

From operation 402 flow continues to operation 404 where sparse metadata corresponding to the application request is identified. In examples, a determination may be made as to whether the credentials associated with an application request correspond to a tenancy or a lifecycle. If the requesting user's credentials are determined to be associated with a tenancy, tenant-specific metadata chunks corresponding to custom tenant-specific user interface and/or user experience application elements may be identified in sparse metadata storage. Similarly, if the requesting user's credentials are determined to be associated with a particular lifecycle, lifecycle-specific metadata chunks corresponding to custom lifecycle-specific user interface and/or user experience application elements may be identified in sparse metadata storage.

From operation 404 flow continues to operation 406 where base metadata needed to complete the application request is identified. That is, for each element of the requested application instance that cannot be generated from the identified lifecycle-specific and/or tenant-specific metadata chunks, base metadata may be identified from one or more base metadata storage computing devices. In a basic example, if a requested application instances comprises four application elements, and two of those elements are custom user interface elements which may be provided based on identification of sparse metadata corresponding to the requesting user's credentials (e.g., tenant-specific metadata, lifecycle-specific metadata), base metadata chunks corresponding to the two remaining application elements needed to complete the request may be identified from base metadata storage.

From operation 406 flow continues to operation 408 where the identified sparse metadata chunks (e.g., tenant-specific metadata, lifecycle-specific metadata) corresponding to the requesting user's credentials, in addition to any base metadata chunks needed to complete the application request, are provided to one or more generation engines for processing into application artifacts, which may be provided to a requesting computing device for display.

From operation 408 flow continues to operation 410 where an application instance comprising a unique user interface and/or user experience corresponding to the application request is caused to be displayed on a display associated with a computing device from which the user has made the application request. The displayed application instance may comprise one or more custom user interface elements and/or user experience elements provided for display based on application artifacts generated from sparse metadata (e.g., lifecycle-specific metadata, tenant-specific metadata) corresponding the requesting user's application credentials, as well as one or more non-custom user interface elements and/or user experience elements provided for display based on application artifacts generated from base metadata identified as being necessary to complete the application request after determining which elements of the requested application instance are not to be provided based on the sparse metadata corresponding to requesting user's tenancy and/or lifecycle.

From operation 410 flow continues to an end operation, and the method 400 ends.

Figure 5:
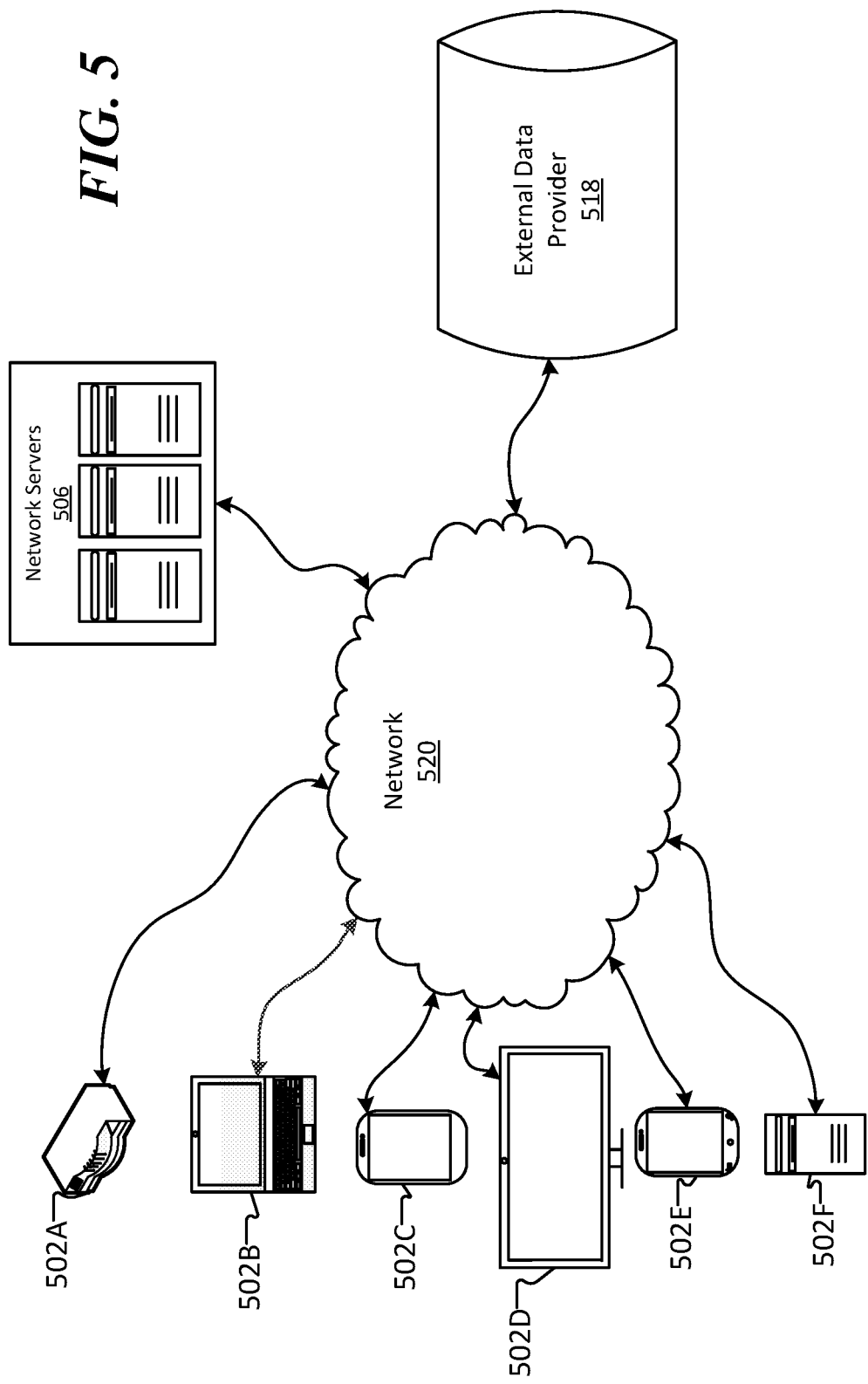
FIG. 5 is a simplified distributed computing network in which various aspects of the present disclosure may be practiced.

FIG. 5 is a simplified diagram of a distributed computing system in which aspects of the present invention may be practiced. According to examples, any of computing devices 502A (a modem), 502B (a laptop computer), 502C (a tablet), 502D (a personal computer), 502E (a smart phone), and 502F (a server) may contain modules, components, engines, etc. for provisioning individualized application instances. Additionally, according to aspects discussed herein, any of computing devices 502A-F may contain necessary hardware for implementing aspects of the disclosure for provisioning individualized application instances as described herein.

Any and all of the operations of the methods described herein for provisioning individualized application instances may be performed, by way of example, at network servers 506 and/or server 502F when computing devices 502A-F request or receive data from external data provider 518 by way of network 520. In examples, network servers 506 and/or server 502F may comprise one or more of a generation engine and/or one or more application modules and/or components for analyzing credentials associated with an application request, identifying whether credentials associated with an application request are associated with custom application elements, and determining whether one or more sparse metadata chunks (e.g., lifecycle-specific metadata, tenant-specific metadata) exist for a particular tenancy and/or lifecycle associated with credentials of a requesting user. Additionally, external data provider 518 may comprise one or more of a generation engine, sparse metadata storage, and base metadata storage.

Figure 6:
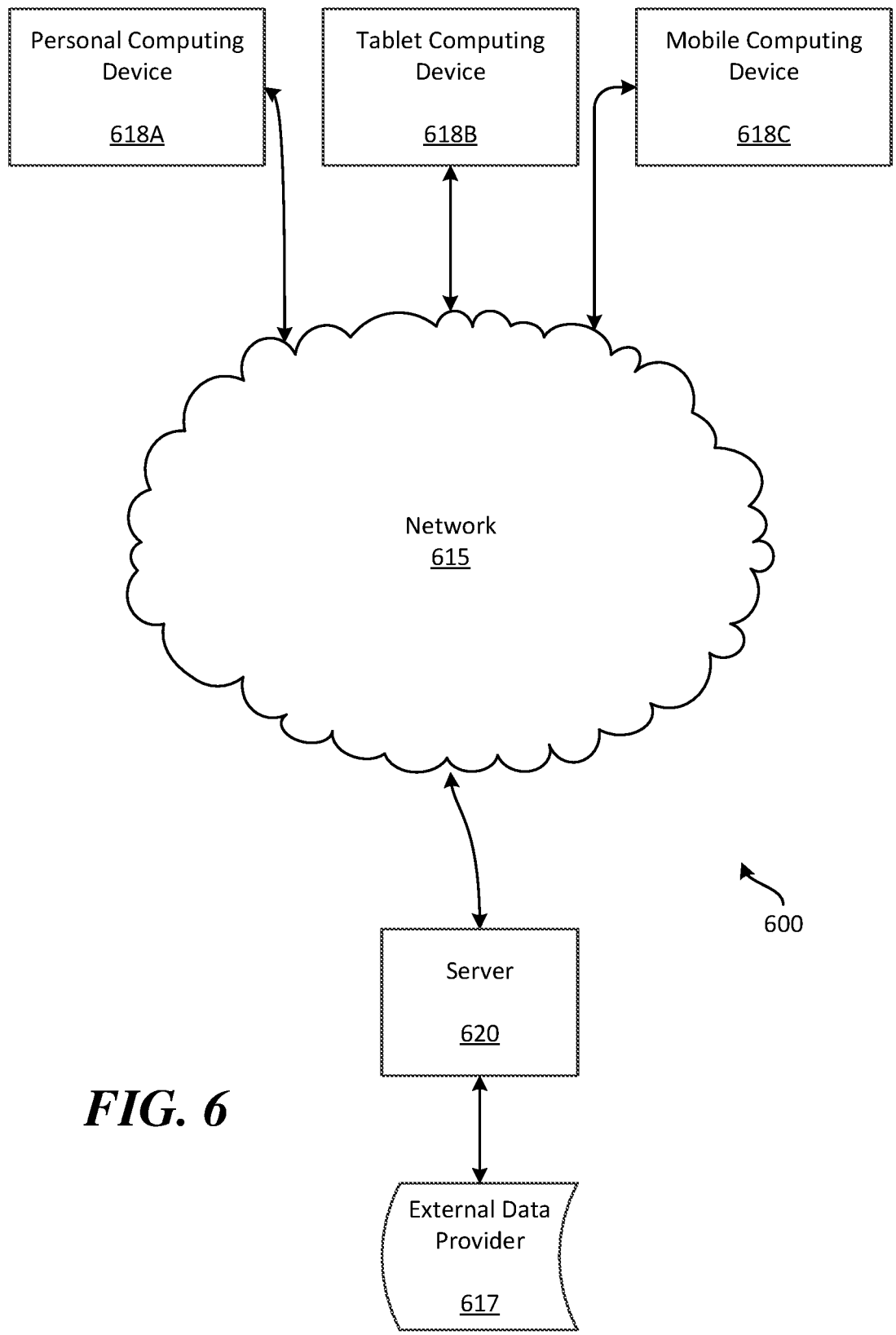
FIG. 6 is a simplified distributed computing network in which various aspects of the present disclosure may be practiced.

Turning to FIG. 6, one embodiment of the architecture of a system for provisioning individualized application instances is provided. Content and/or data interacted with, requested, or edited in association with one or computing devices may be stored in different communication channels or other storage types. For example, data may be stored using a directory service, a web portal, a mailbox service, an instant messaging store, or a compiled networking service for managing, interacting with, and processing sparse and base metadata corresponding to application instance requests. The system for provisioning individualized application instances and executing the operations associated with the methods described herein may use any of these types of systems or the like for enabling data utilization, as described herein. A computing device 618A, 618B, and/or 618C may provide a request to a cloud/network, which is then processed by a server 620 in communication with an external data provider 617. As one example, the server 617 may provide a data stream in response to a processed request for a custom or non-custom application instance over the web to the computing device 618A, 618B, and/or 618C through a network 615. By way of example, a client computing device may be implemented as any of the systems described herein, and embodied in a personal computing device 618A, a tablet computing device 618B, and/or a mobile computing device 618C (e.g., a smart phone, a tablet, etc.). Any of these aspects of the systems described herein may obtain content from the external data provider 617.

In various embodiments, the types of networks used for communication between the computing devices that makeup the present invention include, but are not limited to, an Internet, an intranet, wide area networks (WAN), local area networks (LAN), virtual private networks (VPN), GPS devices, cellular networks, and additional satellite based data providers such as the Iridium satellite constellation which provides voice and data coverage to satellite phones, pagers and integrated transceivers, etc. According to aspects of the present disclosure, the networks may include an enterprise network and a network through which a client computing device may access an enterprise network. According to additional aspects, a client network is a separate network accessing an enterprise network through externally available entry points, such as a gateway, a remote access protocol, or a public or private Internet address.

Additionally, the logical operations may be implemented as algorithms in software, firmware, analog/digital circuitry, and/or any combination thereof, without deviating from the scope of the present disclosure. The software, firmware, or similar sequence of computer instructions may be encoded and stored upon a computer readable storage medium. The software, firmware, or similar sequence of computer instructions may also be encoded within a carrier-wave signal for transmission between computing devices.

Operating environment 600 typically includes at least some form of computer readable media. Computer readable media can be any available media that can be accessed by a processor such as processing device 780 depicted in FIG. 7 and processor 802 shown in FIG. 8 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 600 may be a single computer operating in a networked environment using logical connections to one or more remote computers. The one or more remote computers may comprise a personal computer, a server, a router, a network PC, a peer device or other common network node, and typically includes many or all of the elements described above as well as others not so mentioned. The logical connections may include any method supported by available communications media. Such networking environments are commonplace in enterprise-wide computer networks, intranets and the Internet.

Figure 7:
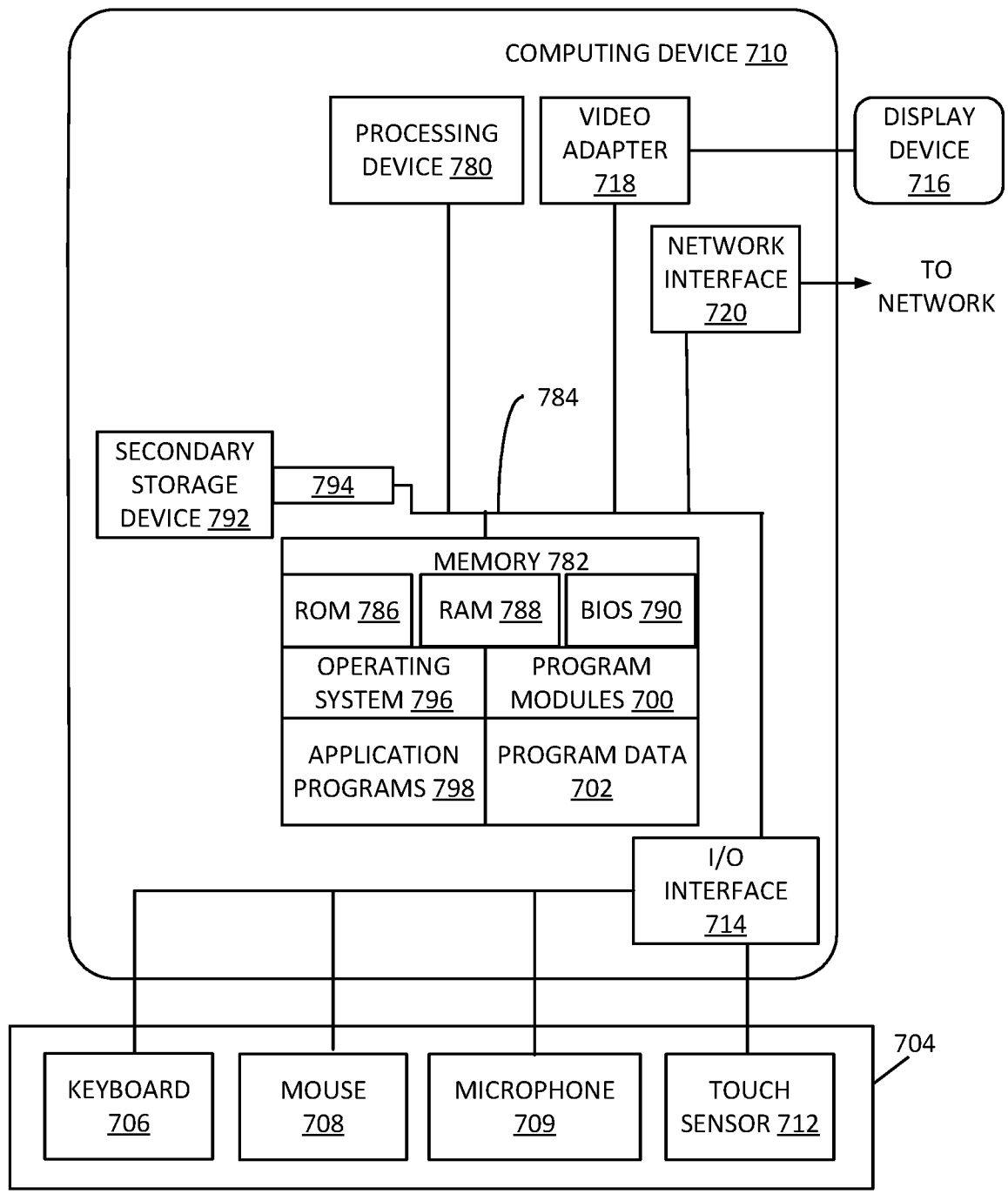
FIG. 7 is a block diagram illustrating example physical components of a computing device with which aspects of the disclosure may be practiced.

FIG. 7 illustrates one aspect in which an exemplary architecture of a computing device 710 that can be used to implement one or more aspects of the present disclosure, including any of the plurality of computing devices described herein with reference to the various figures and their corresponding descriptions. The computing device 710 illustrated in FIG. 7 may be used to execute the operating system, application programs, and software modules (including the software engines) described herein. For example, with respect to FIG. 8 any of the program modules and engines 814 and corresponding operations, including sparse metadata identification engine 816, base metadata identification engine 818, artifact generation module 820, lifecycle detection engine 822, tenant detection module 824, application integration engine 826, and change handling engine, may be executed utilizing the computing device 710 illustrated in FIG. 7. By way of example, the computing device 710 may also be described herein as an individualized application instance provisioning computing device 710. To avoid undue repetition, this description of the computing device will not be separately repeated herein for each of the other computing devices described with regard to the other figures, including computing devices 102A, 102B, 108A, 108B, and server computing device 118 (depicted in FIG. 1), computing device 204 and server computing device 214 (depicted in FIG. 2), computing device 302 (depicted in FIG. 3), computing devices 502A-F and network servers 506 (depicted in FIG. 5), computing devices 618A-618C and server 620 (depicted in FIG. 6), and computing device 800 (depicted in FIG. 8), but such devices can also be configured as illustrated and described with reference to FIG. 7.

The computing device 710 includes, in some embodiments, at least one processing device 780, such as a central processing unit (CPU). A variety of processing devices are available from a variety of manufacturers, for example, Intel, Advanced Micro Devices, and/or ARM microprocessors. In this example, the computing device 710 also includes a system memory 782, and a system bus 784 that couples various system components including the system memory 782 to the processing device 780. The system bus 784 is one of any number of types of bus structures including a memory bus, or memory controller; a peripheral bus; and a local bus using any of a variety of bus architectures.

Examples of computing devices suitable for the computing device 710 include a server computer, a desktop computer, a laptop computer, a tablet computer, a mobile computing device (such as a smart phone, a tablet, a mobile digital device, or other mobile devices), or other devices configured to process digital instructions.

The system memory 782 includes read only memory 786 and random access memory 788. A basic input/output system 790 containing the basic routines that act to transfer information within computing device 710, such as during start up, is typically stored in the read only memory 786.

The computing device 710 also includes a secondary storage device 792 in some embodiments, such as a hard disk drive, for storing digital data. The secondary storage device 792 is connected to the system bus 784 by a secondary storage interface 794. The secondary storage devices 792 and their associated computer readable media provide nonvolatile storage of computer readable instructions (including application programs and program modules), data structures, and other data for the computing device 710. Details regarding the secondary storage devices 792 and their associated computer readable media, as well as their associated nonvolatile storage of computer readable instructions (including application programs and program modules) will be more fully described below with reference to FIG. 8.

Although the exemplary environment described herein employs a hard disk drive as a secondary storage device, other types of computer readable storage media are used in other aspects according to the disclosure. Examples of these other types of computer readable storage media include magnetic cassettes, flash memory cards, digital video disks, Bernoulli cartridges, compact disc read only memories, digital versatile disk read only memories, random access memories, or read only memories. Additional aspects may include non-transitory media. Additionally, such computer readable storage media can include local storage or cloud-based storage.

A number of program modules and/or program engines can be stored in secondary storage device 792 or memory 782, including an operating system 796, one or more application programs 798, other program modules 700 (such as the software engines described herein), and program data 702. The computing device 710 can utilize any suitable operating system, such as Linux, Microsoft Windows™, Google Chrome™, Apple OS, and any other operating system suitable for a computing device.

According to examples, a user provides inputs to the computing device 710 through one or more input devices 704. Examples of input devices 704 include a keyboard 706, mouse 708, microphone 709, and touch sensor 712 (such as a touchpad or touch sensitive display). Additional examples may include other input devices 704. The input devices are often connected to the processing device 780 through an input/output interface 714 that is coupled to the system bus 784. These input devices 704 can be connected by any number of input/output interfaces, such as a parallel port, serial port, game port, or a universal serial bus. Wireless communication between input devices and the interface 714 is possible as well, and includes infrared, BLUETOOTH® wireless technology, cellular and other radio frequency communication systems in some possible aspects.

In an exemplary aspect, a display device 716, such as a monitor, liquid crystal display device, projector, or touch sensitive display device, is also connected to the system bus 784 via an interface, such as a video adapter 718. In addition to the display device 716, the computing device 710 can include various other peripheral devices (not shown), such as speakers or a printer.

When used in a local area networking environment or a wide area networking environment (such as the Internet), the computing device 710 is typically connected to a network such as network 520 shown in FIG. 5 and network 615 shown in FIG. 6 through a network interface 720, such as an Ethernet interface. Other possible embodiments use other communication devices. For example, certain aspects of the computing device 710 may include a modem for communicating across a network.

The computing device 710 typically includes at least some form of computer readable media. Computer readable media includes any available media that can be accessed by the computing device 710. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 710. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 7 is also an example of programmable electronics, which may include one or more such computing devices, and when multiple computing devices are included, such computing devices may be coupled together with a suitable data communication network so as to collectively perform the various functions, methods, or operations disclosed herein.

Figure 8:
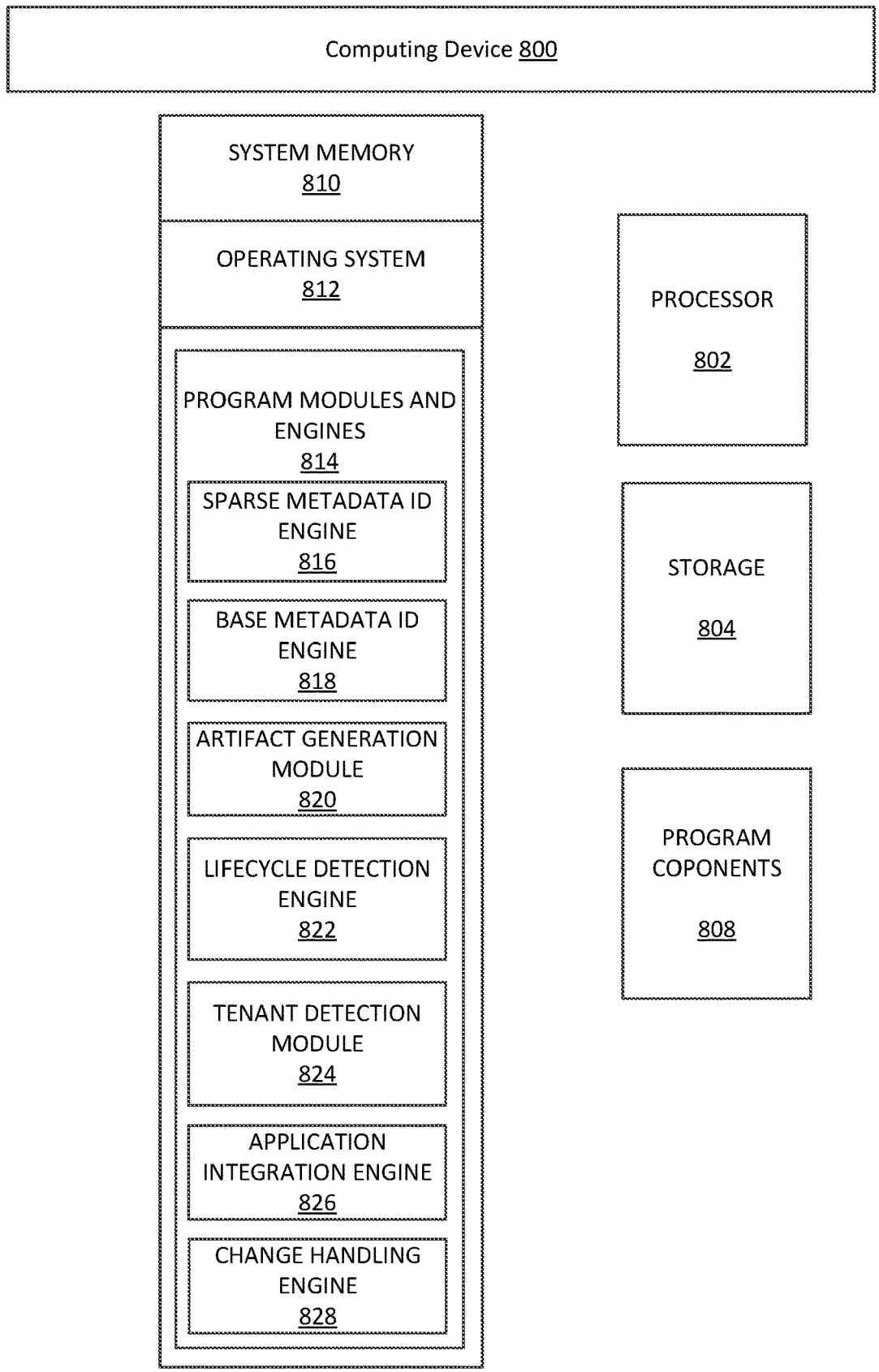
FIG. 8 is a block diagram illustrating physical components (e.g., hardware) of a computing device 800 with which aspects of the disclosure may be practiced.

FIG. 8 is a block diagram illustrating additional physical components (e.g., hardware) of a computing device 800 with which certain aspects of the disclosure may be practiced. The computing device components described below may have computer executable instructions for receiving a request to render an individualized instance of an application; determining, based on the request, whether a sparse metadata chunk exists for each of a plurality of user interface elements associated with the application; generating, for each user interface element for which a sparse metadata chunk is determined to exist, a sparse metadata application artifact; identifying, for each user interface element for which a sparse metadata chunk is determined not to exist, a base user interface chunk of metadata; generating, from each identified base user interface chunk of metadata, a base metadata application artifact; and causing, based on the sparse metadata application artifacts and the base metadata application artifacts, the individualized instance of the application to be displayed. In addition, the computing device components described below may have computer executable instructions for receiving a request to display an individualized application instance of an application, the request comprising at least one sparse metadata identifier associated with the application instance; identifying sparse metadata associated with the at least one sparse metadata identifier; identifying base metadata associated with the application; generating the application instance based on the identified sparse metadata and the identified base metadata; and causing the application instance to be displayed on a graphical user interface associated with the request.

Computing device 800 may perform the above-described functions alone or in combination with a distributed computing network such as those described with regard to FIGS. 5 and 6 which may be in operative contact with personal computing device 618A, tablet computing device 618B and/or mobile computing device 618C which may communicate and process one or more of the program modules and/or program engines described in FIG. 8 including: sparse metadata identification engine 816, base metadata identification engine 818, artifact generation module 820, lifecycle detection engine 822, tenant detection module 824, application integration engine 826, and change handling engine. According to additional examples, computing device 800 may be in communicative contact via the distributed computing networks described in FIGS. 5 and 6 and computing device 800 may comprise and describe any of computing devices 502A, 502B, 502C, 502D, 502E and 502F.

In a basic configuration, the computing device 800 may include at least one processor 802 and a system memory 810. Depending on the configuration and type of computing device, the system memory 810 may comprise, but is not limited to, volatile storage (e.g., random access memory), non-volatile storage (e.g., read-only memory), flash memory, or any combination of such memories. The system memory 810 may include an operating system 812 and one or more program modules and engines 814 suitable for provisioning individualized application instances, such as one or more components in regards to FIG. 8 and, in particular, sparse metadata identification engine 816, base metadata identification engine 818, artifact generation module 820, lifecycle detection engine 822, tenant detection module 824, application integration engine 826, and change handling engine. The operating system 812, for example, may be suitable for controlling the operation of the computing device 800. Furthermore, aspects of the disclosure may be practiced in conjunction with a graphics library, other operating systems, or any other application program and is not limited to any particular application or system.

The computing device 800 may have additional features or functionality. For example, the computing device 800 may also include additional data storage device (removable and/or non-removable) such as, for example, magnetic disks, optical disks, or tape. Such additional storage is illustrated in FIG. 8 by storage 804. It will be well understood by those of skill in the art that storage may also occur via the distributed computing networks described in FIG. 5 and FIG. 6. For example, computing device 800 may communicate via network 520 in FIG. 5 and data may be stored within network servers 506 and transmitted back to computing device 800 via network 520 if it is determined that such stored data is necessary to execute one or more functions described herein. Additionally, computing device 800 may communicate via network 615 in FIG. 6 and data may be stored within server 620 and transmitted back to computing device 800 via network 615 if it is determined that such stored data is necessary to execute one or more functions described herein.

As stated above, a number of program modules and data files may be stored in the system memory 810. While executing the processor 802, the program modules and engines 814 (e.g., sparse metadata identification engine 816) may perform processes including, but not limited to, the aspects described herein. Other program modules and engines may be used in accordance with aspects of the present disclosure.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing form the true spirit and scope of the following claims.

What is claimed is:

1. A method for provisioning individualized application instances, comprising:
   receiving a request to display an individualized application instance of an application, the request comprising at least one sparse metadata identifier associated with the individualized application instance;
   identifying sparse metadata from a sparse metadata layer associated with the application, wherein the sparse metadata is identified based on the at least one sparse metadata identifier;
   determining, based on the at least one sparse metadata identifier associated with the individualized application instance, that sparse metadata does not exist for at least one element of the individualized application instance;
   identifying base metadata, wherein the base metadata includes metadata corresponding to the at least one element for which sparse metadata does not exist;
   obtaining the base metadata from a base metadata layer associated with the application, wherein the base metadata makes up a base application;
   obtaining the sparse metadata from the sparse metadata layer;
   generating the individualized application instance from at least the base metadata and the sparse metadata; and
   enabling the individualized application instance to be displayed on a graphical user interface associated with the request.

2. The method of claim 1, wherein the at least one sparse metadata identifier comprises a user identifier associated with the individualized application instance.

3. The method of claim 1, wherein the at least one sparse metadata identifier comprises a tenant identifier associated with the individualized application instance.

4. The method of claim 1, wherein the application is an enterprise resource planning application.

5. The method of claim 1, wherein the at least one element of the individualized application instance comprises a user experience element of the individualized application instance.

6. The method of claim 1, wherein the at least one element of the individualized application instance comprises a user interface element of the individualized application instance.

7. The method of claim 6, wherein the at least one element of the individualized application instance comprises an audio element of the individualized application instance.

8. The method of claim 1, wherein generating the individualized application instance from the base metadata and the sparse metadata comprises generating a plurality of artifacts from the sparse metadata and the base metadata.

9. The method of claim 8, wherein the artifacts are generated in an HTML format.

10. The method of claim 1, wherein the sparse metadata is created through a no-code generation engine.

11. A system for provisioning individualized application instances, comprising:
    at least one processor; and
    a memory operatively connected to the at least one processor, the memory comprising computer-executable instructions that, when executed by the at least one processor, are operative to:
    receive a request to display an individualized application instance of an application, the request comprising at least one sparse metadata identifier associated with the individualized application instance;
    identify sparse metadata from a sparse metadata layer associated with the application, wherein the sparse metadata is identified based on the at least one sparse metadata identifier;
    determine, based on the at least one sparse metadata identifier associated with the individualized application instance, that sparse metadata does not exist for at least one element of the individualized application instance;
    identify base metadata, wherein the base metadata includes metadata corresponding to the at least one element for which sparse metadata does not exist;
    obtain the base metadata from a base metadata layer associated with the application, wherein the base metadata makes up a base application;
    obtain the sparse metadata from the sparse metadata layer;
    generate the individualized application instance from at least the base metadata and the sparse metadata; and
    enable the individualized application instance to be displayed on a graphical user interface associated with the request.

12. The system of claim 11, wherein the base metadata is utilized in generating the individualized application instance for each component of the individualized application instance for which there is no sparse metadata identifier corresponding to the request.

13. The system of claim 11, wherein the at least one element of the individualized application instance comprises a user experience element of the individualized application instance.

14. The system of claim 11, wherein the at least one sparse metadata identifier comprises one or more of: a tenant ID, a user ID, and a geographic zone ID.

15. A computer-readable storage device comprising executable instructions that, when executed by one or more processors, assists with provisioning an individualized application instance, the computer-readable storage device including instructions executable by the one or more processors for:
    receiving a request to render an individualized instance of an application, wherein the request comprises at least one sparse metadata identifier associated with the individualized application instance;
    determining, based on the request, whether a corresponding sparse metadata chunk exists for each of a plurality of user interface elements associated with the application, wherein the corresponding sparse metadata chunk is identified based on the at least one sparse metadata identifier;
    determining, based on the at least one sparse metadata identifier associated with the individualized application instance, that a sparse metadata chunk does not exist for at least one user interface element of the plurality of user interface elements associated with the application;
    obtaining the corresponding sparse metadata chunk from a sparse metadata layer associated with the application;
    identifying a base metadata chunk for the at least one user interface element for which the corresponding sparse metadata chunk does not exist;

obtaining the base metadata chunk from a base metadata layer associated with the application;

generating the individualized instance of the application from at least the base metadata chunk and the sparse metadata chunk; and enabling presentation of the individualized instance of the application.

16. The computer-readable storage device of claim 15, wherein generating the individualized application instance comprises:

generating a sparse metadata application artifact for each of the plurality of user interface elements for which the corresponding sparse metadata chunk is determined to exist; and generating a base metadata application artifact from each identified base metadata chunk.

17. The computer-readable storage device of claim 16, wherein enabling presentation of the individualized instance of the application is based on the sparse metadata application artifacts and the base metadata application artifacts.

18. The computer-readable storage device of claim 15, wherein the application is an enterprise resource planning application.

19. The computer-readable storage device of claim 18, wherein the enterprise resource planning application is associated with an enterprise resource planning application suite comprising a plurality of enterprise resource planning applications.

20. The computer-readable storage device of claim 19, wherein the executable instructions are further executable by the one or more processors for:

receiving a request to switch from the individualized instance of the application to a different one of the plurality of enterprise resource planning applications;

identifying, based on the identifier, sparse metadata associated with the different one of the plurality of enterprise resource planning applications; and enabling presentation, based at least in part on the sparse metadata associated with the different one of the plurality of enterprise resource planning applications and base metadata for the different one of the plurality of enterprise resource planning applications, of the different one of the plurality of enterprise resource planning applications.

\* \* \* \* \*